(12) United States Patent
Kang

(10) Patent No.: US 6,225,763 B1
(45) Date of Patent: May 1, 2001

(54) FET DISCHARGING CIRCUIT OF A HORIZONTAL DEFLECTION CIRCUIT

(75) Inventor: Chun-Seong Kang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/258,807

(22) Filed: Feb. 26, 1999

(30) Foreign Application Priority Data

Feb. 26, 1998 (KR) ................................................. 98-2646

(51) Int. Cl.[7] ........................................................ G09G 1/04
(52) U.S. Cl. ............................................ 315/370; 315/399
(58) Field of Search ............................. 315/370, 368.18, 315/371, 399, 403, 408, 411

(56) References Cited

U.S. PATENT DOCUMENTS

| | | | |
|---|---|---|---|
| 4,707,640 | * 11/1987 | Onozawa et al. | 315/399 |
| 5,068,581 | * 11/1991 | Nishiura et al. | 315/370 |
| 5,517,090 | * 5/1996 | Bando | 315/370 |
| 5,703,443 | * 12/1997 | Kwon | 315/408 |
| 5,831,398 | * 11/1998 | Kim | 315/371 |
| 5,877,598 | * 3/1999 | Pistemaa | 315/370 |
| 5,949,201 | * 9/1999 | Suzuki et al. | 315/370 |
| 5,955,848 | * 9/1999 | Arima et al. | 315/371 |
| 5,962,994 | * 10/1999 | Kwon et al. | 315/370 |
| 6,081,079 | * 6/2000 | Lee | 315/408 |

* cited by examiner

*Primary Examiner*—Don Wong
*Assistant Examiner*—Thuy Vinh Tran

(74) *Attorney, Agent, or Firm*—Robert E. Bushnell, Esq.

(57) ABSTRACT

In a field effect transistor (FET) discharging circuit for a horizontal deflection circuit, a backward voltage is removed by employing a diode to discharge a high level voltage formed on the FET. The FET discharging circuit includes: a horizontal oscillator responsive to a horizontal synchronous signal from a microcomputer for generating an output having the same horizontal oscillating frequency as the horizontal synchronous signal; a horizontal driving unit responsive to the output of the horizontal oscillator for generating an amplified pulse waveform of the same frequency as the horizontal oscillating frequency, and for outputting the amplified pulse through a transformer which provides electrical isolation from a high level power circuit; a horizontal outputting unit responsive to the output of the horizontal driving unit for supplying a current to a horizontal deflection coil, the horizontal outputting unit being connected in parallel to a damping diode and a resonance condenser for resonating with the horizontal deflection coil; and an S-shaped correcting unit connected in series with the horizontal deflection coil for linearly correcting a distorted displayed image, the S-shaped correcting unit having a discharge device for instantly discharging when a high overvoltage is generated because of abnormal operation. The horizontal deflection coil is connected in series with the horizontal outputting unit for receiving an output current from the horizontal unit, and generates a sawtooth current to adjust right and left deflections of an electron beam on a screen. As a result, any overvoltage formed at the transient state, when the FET is turned on or off, is removed by a quick discharging effect, thereby improving performance of the circuit.

18 Claims, 3 Drawing Sheets

FET DISCHARGING CIRCUIT OF A HORIZONTAL DEFLECTION CIRCUIT

CLAIM OF PRIORITY

This application makes reference to, incorporates the same herein, and claims all benefits accruing under 35 U.S.C. § 119 from an application entitled FET Discharging Circuit of a Horizontal Deflection Circuit earlier filed in the Korean Industrial Property Office on Feb. 26, 1998, and there duly assigned Ser. No. 98-2646 by that Office.

BACKGROUND OF THE INVENTION

1. Technical Field

The present invention relates, in general, to a field effect transistor (FET) discharging circuit for a horizontal deflection circuit in a cathode ray tube display apparatus. More particularly, the invention relates to an FET discharging circuit for a horizontal deflection circuit in which a backward voltage is removed by connecting a diode, instead of a resistance, for discharging a high level voltage formed on an FET.

Generally, a cathode ray tube display apparatus has a vertical and a horizontal deflection circuit for deflecting an election beam discharged from a cathode of the cathode ray tube.

As explained in more detailed below, a horizontal deflection circuit for a cathode ray tube display apparatus includes a horizontal oscillator, a horizontal driving unit, a horizontal outputting unit, and an S-shaped correcting unit. The S-shaped correcting unit is typically connected in series with a horizontal deflection coil so as to linearly correct an image which is displayed in a distorted manner on the screen of the cathode ray tube.

In such arrangements, a high voltage generated at the output of the circuit can be removed by a discharge resistance provided in the output circuit. However, in actual practice, higher voltages occur in the output circuit, and it takes more time to discharge such higher voltages. This causes damage to the components of the output circuitry.

Therefore, there is a need for the development of an FED discharging circuit for a horizontal deflection circuit which is capable of producing an improved discharged effect such that the higher voltages, which cannot be quickly discharged in previous arrangements, can be discharged instantly without damage to the output circuit components.

SUMMARY OF THE INVENTION

An object of the present invention is to provide an FET discharging circuit for a horizontal deflection circuit which is capable of improving a discharge effect by using a circuit in which a condenser is connected in parallel with a diode. That is in contrast with the arrangements of the conventional art in which discharging is performed by a resistance connected in parallel with an FET.

To achieve the above objects, there is provided an FET discharging circuit for a horizontal deflection circuit which includes: a horizontal oscillator for receiving a horizontal synchronous signal from a microcomputer, and for generating an output signal having a horizontal oscillating frequency identical to that of the horizontal synchronous signal; a horizontal driving unit driven by the output signal of the horizontal oscillator for generating an amplified pulse waveform of the same frequency as the horizontal oscillating frequency, and for outputting the amplified pulse through a transformer which provides electrical isolation from a high level power circuit; a horizontal outputting unit, driven by the output signal of the horizontal driving unit, for supplying a current to a horizontal deflection coil, the horizontal outputting unit being connected in parallel with a damping diode and a resonance condenser for resonating with the horizontal deflection coil, the horizontal deflection coil being connected in series with the horizontal outputting unit for receiving an output current from the horizontal outputting unit, and for generating a sawtooth current to adjust right and left deflections an electron beam of a screen; and an S-shaped correcting unit connected in series with the horizontal deflection coil for linearly correcting an image displayed in a distorted manner, the S-shaped correcting unit having a discharge device for instantly discharging when a high overvoltage is generated due to an abnormal operation.

Additional advantages, objects and other features of the invention will be set forth in part in the description which follows, and in part will become apparent to those having ordinary skill in the art upon examination of the following, or may be learned from practice of the invention. The object and advantages of the invention may be realized and attained as particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An operation of an FET discharging circuit of a horizontal deflection circuit of the present invention will now be described with reference to the accompanying drawings.

Figure 1:
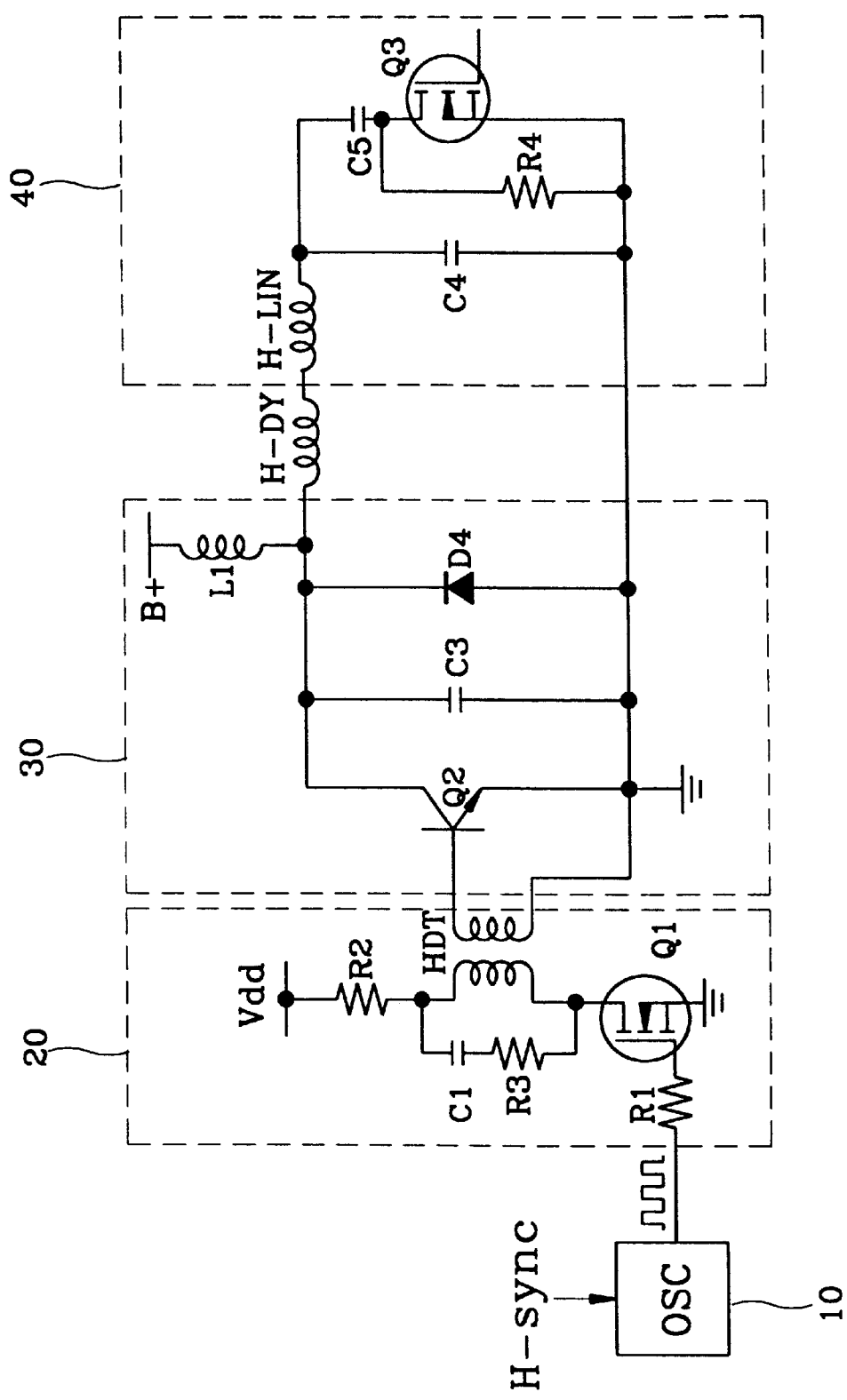
FIG. 1 is a horizontal deflection circuit diagram having an FET discharging circuit.

FIG. 1 shows a horizontal deflection circuit having an FET discharging circuit.

As shown in FIG. 1, the horizontal deflection circuit of the cathode ray tube display apparatus includes: a horizontal oscillator 10 for receiving a horizontal synchronous signal H-sync; a horizontal driving unit 20 for receiving and generating an output signal corresponding to that of the horizontal oscillator 10; a horizontal outputting unit 30 which is driven by the output signal of the horizontal driving unit 20; and an S-shaped correcting unit 40 for linearly correcting an image. A horizontal deflection coil H-DY receives the output current of the horizontal outputting unit 30, and a discharge resistance R4 and a condenser C4, C5 are connected serially to the horizontal deflection coil H-DY for linearly correcting the image.

The composition of the horizontal oscillator 10, horizontal driving unit 20 and horizontal outputting unit 30 of FIG. 1 is identical to the composition of the horizontal oscillator 110, horizontal driving unit 120 and horizontal outputting unit 130 of FIGS. 2 and 3, and those compositions are explained in more detailed below. Therefore, the explanation of the composition of elements 10, 20 and 30 of FIG. 1 is omitted at this time.

The operation of the horizontal deflection circuit of the cathode ray tube display apparatus shown in FIG. 1 will now be described.

When a horizontal synchronous signal H-sync is applied to the horizontal oscillator 10, the horizontal oscillator 10 generates an output having a horizontal oscillating frequency identical to the frequency of the input horizontal synchronous signal.

Being driven by the output signal of the horizontal oscillator 10, the horizontal driving unit 20 generates a pulse waveform output of the same frequency as the horizontal oscillating frequency.

This output is a waveform which is sufficiently amplified to enable the horizontal outputting unit 30 to operate.

The horizontal outputting unit 30, driven by the output signal of the horizontal driving unit 20, supplies a current to the horizontal deflection coil H-DY. Upon receipt of that current, the horizontal deflection coil H-DY generates a sawtooth current.

The sawtooth current is applied to a deflection yoke of the cathode ray tube so that the electron beam discharged from an electron gun of the cathode ray tube is horizontally deflected to the right and left.

The S-shaped correcting unit 40 is connected in series with the horizontal deflection coil H-DY so as to linearly correct the image displayed in a distorted manner on the screen of the cathode ray tube, such distortion being caused by the difference in flight distance of the discharge electrons.

Thus, the S-shaped correcting unit 40 serves to correct the sawtooth current generated by the horizontal deflection coil H-DY so that it assumes an S-shaped form. The S-shaped correcting unit 40 includes an S-shaped condenser C4 and C5, and a resistance R4 connected in parallel with an FET Q3.

However, while the horizontal deflection circuit is being operated, when the FET Q3 is turned off, or when a monitor circuit is in a transient state at the state of OFF, an abnormal operation occurs.

Then, a high voltage is generated at the FET Q3 and, in order to remove this high voltage, a discharging resistance R4 is provided. The discharging resistance R4 is designed for a situation wherein a high voltage is applied to the second FET Q3.

However, in actuality, a higher voltage than that of the condenser C4 is applied to the FET Q3, and it takes more time to discharge it. This causes damage to the FET Q3.

Figure 2:
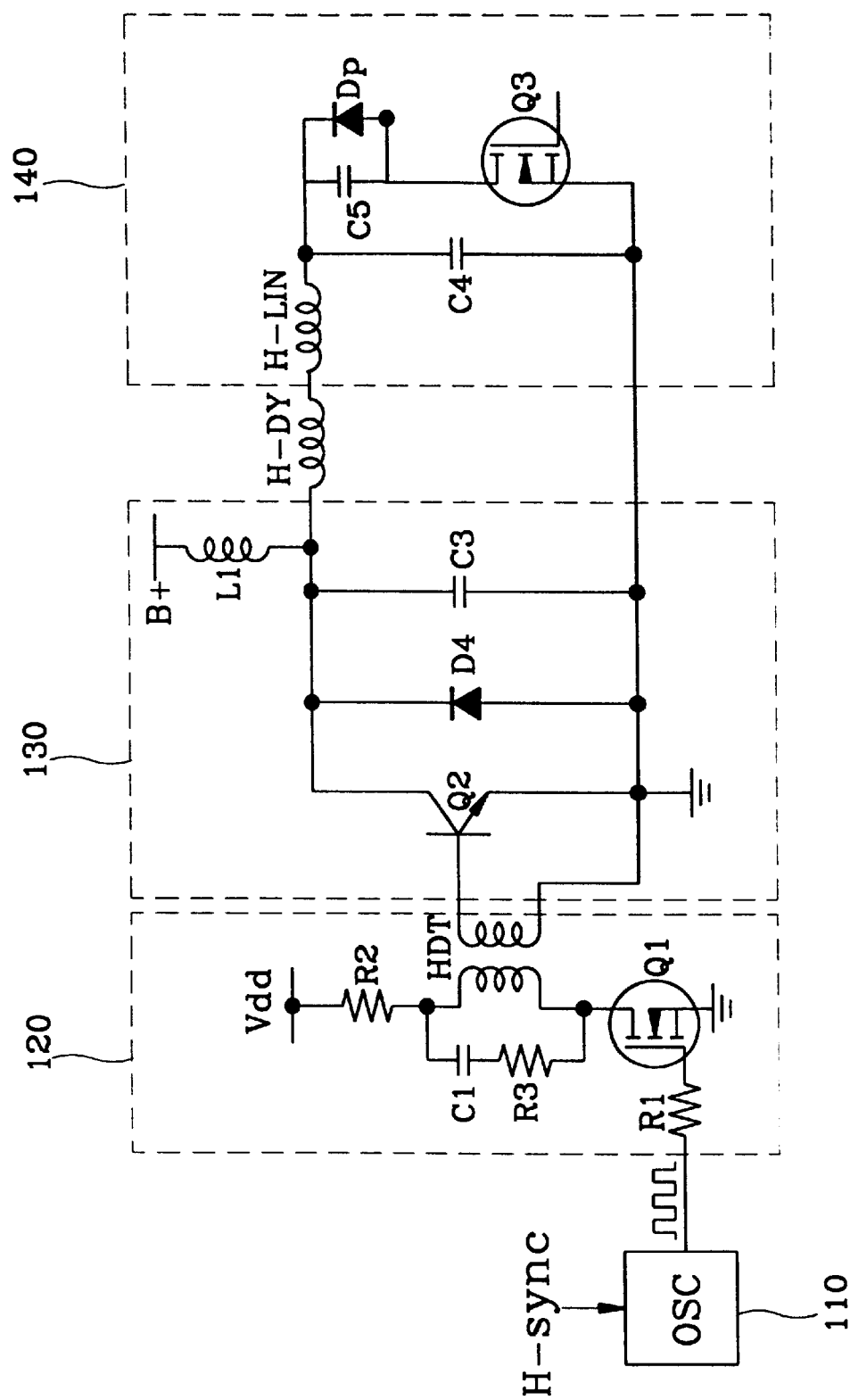
FIG. 2 is a horizontal circuit diagram having an FET discharging circuit in accordance with the present invention.

FIG. 2 is a horizontal circuit diagram having an FET discharging circuit in accordance with the present invention.

As shown in FIG. 2, upon receipt of a horizontal synchronous signal H-sync, horizontal oscillator 110 generates an output having the same horizontal oscillating frequency, and provides that output to horizontal driving unit 120.

The horizontal driving unit 120 includes: a first FET Q1 driven by applying the output signal from horizontal oscillator 110 to FET Q1 via resistance R1 as a gate driving signal; a horizontal driving transformer HDT operated according to an ON/OFF state of the first FET Q1; a condenser C1 and a resistance R3 for protecting the first FET Q1 from back electromotive voltage generated by a primary coil of the horizontal driving transformer HDT; a gate current limit resistance R1 of field effect transistor Q1; and a resistance R2 for limiting a current outputted from a power source +Vdd.

The horizontal driving unit 120 is driven by the horizontal oscillating frequency outputted from the horizontal oscillator 110 so as to have the same frequency as the horizontal oscillating frequency, and generates an amplified pulse waveform for driving a horizontal output transistor Q2 in the horizontal outputting unit 130.

In order to connect the horizontal driving unit 120, which is connected to the horizontal oscillator 110 with low power consumption, to a high level power circuit of the horizontal outputting unit 130, as the two are electrically isolated, a transformer such as horizontal driving transformer HDT is generally used.

The horizontal outputting unit 130 includes the horizontal output transistor Q2, a resonance condenser C3 for resonating with the horizontal deflection coil H-DY, and a damping diode D4, all connected in parallel. Unit 130 also includes a collector current limit coil L1.

The diode D4, which reduces switching time of the transistor Q2 and controls ON time, is connected in parallel with polar condenser C3. One end of the polar condenser C3, an anode of the diode D4, and an emitter of the horizontal output transistor Q2 are commonly grounded to the second end of the horizontal driving transformer HDT.

As the horizontal output transistor Q2 is driven by the output signal from the horizontal driving unit 120, the horizontal outputting unit 130 supplies a current to the S-shaped correction unit 140 and to the horizontal deflection coil H-DY.

Upon receipt of the driving current from the horizontal outputting unit 130, the horizontal deflection coil H-DY generates a sawtooth current. This sawtooth current is applied to the deflection yoke of the cathode ray tube, so that the electron beam discharged from the electron gun of the cathode ray tube is horizontally deflected to the right and left.

The S-shaped correcting unit 140 includes a linearity correction coil H-LIN connected in series with the horizontal deflection coil H-DY, and condensers C4 and C5 connected in parallel. The linearity correction coil H-LIN corrects linearity between scanning lines, and the condensers C4 and C5 correct the sawtooth current generated at the horizontal deflection coil H-DY so that it has an S-shaped form so as to linearly correct the image displayed in a distorted manner on the screen of the cathode ray tube. The distortion is caused by a difference in flight distance of the discharging electrons.

In the past, for the purpose of discharging the high level voltage formed at the second FET Q3, which serves as a switch for the S-correction condenser C4 and C5, a resistance was connected in parallel with the second FET Q3. Instead, in the present invention, the diode Dp is connected in parallel with a fifth condenser C5 so that, even if a high level voltage is generated at the second FET Q3 due to possible abnormal operation, it is instantly discharged by the diode Dp.

Figure 3:
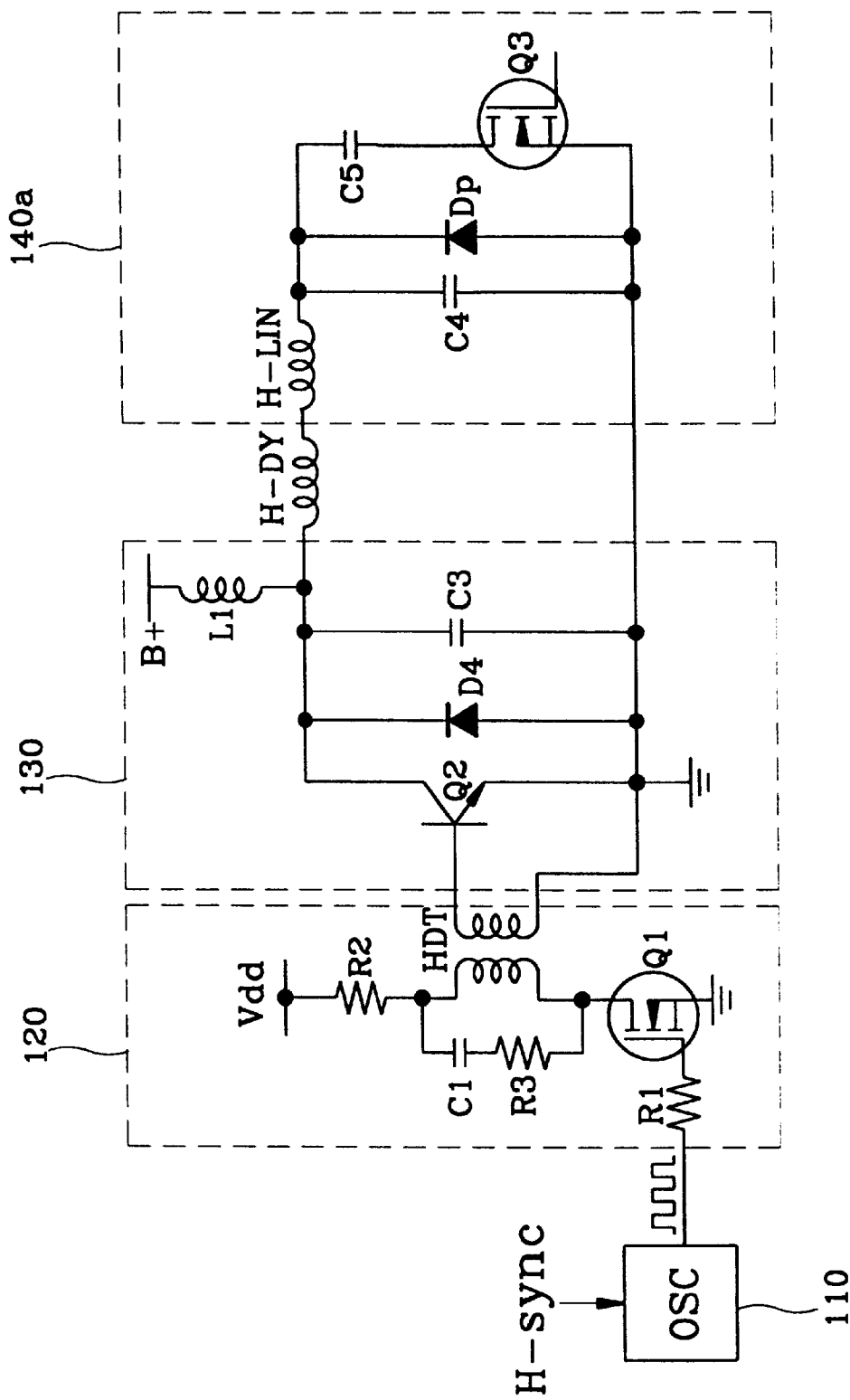
FIG. 3 is a circuit diagram illustrating another embodiment of the S-shaped correcting unit shown in FIG. 2.

FIG. 3 is a circuit diagram illustrating another embodiment of the S-shaped correction unit shown in FIG. 2.

As shown in FIG. 3, the configuration of horizontal driving unit 120 and horizontal outputting unit 130 is identical to the configuration of horizontal driving unit 120 and horizontal outputting unit 130 shown in FIG. 2.

S-shaped correcting unit 140a has a linearity correction coil H-LIN connected in series with horizontal deflection coil H-DY, and condensers C4 and C5 connected in parallel with horizontal deflection coil H-DY.

Linearity correction coil H-LIN described above corrects the linearity between scanning lines, and condensers C4 and C5 correct the sawtooth current generated by horizontal deflection coil H-DY so that it is S-shaped so as to linearly correct the image displayed in a distorted manner on the screen of the cathode ray tube, such distortion being caused by the difference in flight distance of the discharge electrons.

Since diode Dp is connected in parallel with fourth condenser C4, even if a high level voltage is generated at second FET Q3 due to abnormal operation, it is instantly discharged by diode Dp.

As a result, since the voltage of the second FET Q3 is not higher than that of the fourth condenser C4, no backward voltage occurs at the condenser C4. In addition, since the overvoltage generated at the transient state when the second FET Q3 is turned on or off is removed by the quick discharging effect, damage to the second FET Q3 can be prevented.

As thus described, the FET discharging circuit of the horizontal deflection circuit of the present invention does not perform discharging by using a resistance connected in parallel to a condenser, as in the conventional art. Rather, in the invention, the condenser C5 in FIG. 2 or C4 in FIG. 3 is connected in parallel to the diode Dp so that the overvoltage formed at the transient state, when the FET Q3 is turned on or off, is removed by a quick discharging effect. Therefore, the discharging effect is highly improved, and damage to the FET Q3 is prevented.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A field effect transistor (FET) discharging circuit for a horizontal deflection circuit having a horizontal deflection coil, said circuit comprising:
    a horizontal oscillator for receiving a horizontal synchronous signal having a frequency, and for generating an output having a horizontal oscillating frequency identical to the frequency of the horizontal synchronous signal;
    a horizontal driving unit responsive to the output of the horizontal oscillator for generating an amplified pulse waveform having a frequency that is the same as the frequency of the horizontal oscillating frequency, and for outputting the amplified pulse through a transformer to provide an output of the horizontal driving unit; and
    a horizontal outputting unit responsive to the output of the horizontal driving unit for supplying an output current to the horizontal deflection coil, the horizontal outputting unit being connected in parallel to a damping diode and a resonance condenser for resonating with the horizontal deflection coil;
    wherein the horizontal deflection coil is connected in series with the horizontal outputting unit for receiving the output current from the horizontal outputting unit, and for generating a sawtooth current to adjust right and left deflections of an election beam on a screen; and
    said circuit further comprising an S-shaped correcting unit connected in series with the horizontal deflection coil for linearly correcting an image which is displayed in a distorted manner, the S-shaped correcting unit having a discharge device for instantly discharging when a high overvoltage is generated because of abnormal operation.

2. The circuit as claimed in claim 1, wherein the S-shaped correcting unit includes:
    a linearity correction device connected in series with the horizontal deflection coil so as to correct a linearity between scanning lines;
    first and second charging devices connected in series with the linearity correction device and connected in parallel with each other for linearly correcting an image displayed in a distorted manner;
    a correction switching device connected in series with the second charging device and having a switching function; and
    a discharging device connected in parallel with one of the first and second charging devices for discharging an overvoltage instantly as formed.

3. The circuit as claimed in claim 2, wherein the discharging device comprises a diode.

4. The circuit as claimed in claim 2, wherein the discharging device is connected in parallel with the first charging device.

5. The circuit as claimed in claim 2, wherein the discharging device is connected in parallel with the second charging device.

6. The circuit as claimed in claim 5, wherein the discharging device is also connected in series with the correction switching device.

7. The circuit as claimed in claim 2, wherein the correction switching device comprises a field effect transistor.

8. The circuit as claimed in claim 2, wherein each of the first and second charging devices comprises a condenser.

9. A discharging circuit for a horizontal deflection circuit having a horizontal deflection coil, said discharging circuit comprising:
    horizontal oscillator means responsive to a horizontal synchronous signal having a frequency for generating an output having a horizontal oscillating frequency;
    horizontal driving and output means responsive to the output of horizontal oscillator means for supplying an output current to the horizontal deflection coil, the horizontal deflection coil being connected in series with the horizontal driving and output means for receiving the output current from the horizontal driving and output means, and for generating a sawtooth current to adjust left and right deflections of an electron beam on a screen; and
    S-shaped correcting means connected in series with the horizontal deflection coil for linearly correcting an image displayed in a distorted manner, said S-shaped correcting means instantly discharging a high overvoltage generated due to abnormal operation of the circuit.

10. The circuit as claimed in claim 9, wherein the S-shaped correcting means includes:
    a linearity correction device connected in series with the horizontal deflection coil so as to correct a linearity between scanning lines;
    first and second charging devices connected in series with the linearity connection device and connected in parallel with each other for linearly correcting an image displayed in a distorted manner;
    a correction switching device connected in series with the second charging device and having a switching function; and
    a discharging device connected in parallel with one of the first and second charging devices for discharging an overvoltage instantly as formed.

11. The circuit as claimed in claim 10, wherein the discharging device comprises a diode.

12. The circuit as claimed in claim 10, wherein the discharging device is connected in parallel with the first charging device.

13. The circuit as claimed in claim 10, wherein the discharging device is connected in parallel with the second charging device.

14. The circuit as claimed in claim 13, wherein the discharging device is also connected in series with the correction switching device.

15. The circuit as claimed in claim 10, wherein the correction switching device comprises a field effect transistor.

16. The circuit as claimed in claim 10, wherein each of the first and second charging devices comprises a condenser.

17. The circuit as claimed in claim 9, wherein said S-shaped correcting means comprises a first charging device, a second charging device, a switching device and a discharging device, said second charging device and said discharging device being connected in parallel to form a parallel circuit, said parallel circuit being connected in series with said switching device to form a series circuit, said series circuit being connected in parallel with said first charging device.

18. The circuit as claimed in claim 9, wherein said S-shaped correcting means comprises a first charging device, a second charging device, a switching device and a discharging device, said second charging device and said switching device being connected in series to form a series circuit, said series circuit being connected in parallel with said first charging device and said discharging device, respectively.

* * * * *